United States Patent
Liu et al.

(10) Patent No.: US 11,483,821 B2
(45) Date of Patent: Oct. 25, 2022

(54) FEEDBACK INFORMATION TRANSMISSION METHOD, TERMINAL DEVICE, AND ACCESS NETWORK DEVICE

(71) Applicant: HUAWEI TECHNOLOGIES CO., LTD., Guangdong (CN)

(72) Inventors: Hang Liu, Beijing (CN); Zhenzhen Cao, Beijing (CN); Mingchao Li, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 16/730,356

(22) Filed: Dec. 30, 2019

(65) Prior Publication Data

US 2020/0137738 A1    Apr. 30, 2020

Related U.S. Application Data

(63) Continuation of application No. PCT/CN2018/087261, filed on May 17, 2018.

(30) Foreign Application Priority Data

Jul. 3, 2017    (CN) .......................... 201710534003.7

(51) Int. Cl.
*H04W 72/04* (2009.01)
*H04W 92/18* (2009.01)

(52) U.S. Cl.
CPC ....... *H04W 72/044* (2013.01); *H04W 72/042* (2013.01); *H04W 72/0406* (2013.01); *H04W 92/18* (2013.01)

(58) Field of Classification Search
CPC ... H04L 5/0064; H04L 5/0007; H04L 5/0032; H04L 5/0044; H04L 5/0091;
(Continued)

(56) References Cited

U.S. PATENT DOCUMENTS

2016/0044665 A1*   2/2016   Novlan ............. H04W 72/0406
                                                                370/336
2016/0295624 A1*  10/2016   Novlan ................... H04L 67/12
(Continued)

FOREIGN PATENT DOCUMENTS

| CN | 105338467 A | 2/2016 |
| CN | 105453672 A | 3/2016 |

(Continued)

OTHER PUBLICATIONS

Huawei, HiSilicon, "Scenario and design criteria on flexible numerologies," 3GPP TSG RAN WG1 Meeting #84bis, R1-162156, Busan, Korea, Apr. 11-15, 2016, 7 pages.

(Continued)

*Primary Examiner* — Maharishi V Khirodhar
*Assistant Examiner* — Kenneth P Hunt
(74) *Attorney, Agent, or Firm* — Fish & Richardson P.C.

(57) ABSTRACT

The present disclosure relates to data sending methods, terminal devices, access network devices, and systems. One example method includes receiving, by a first terminal device, first resource configuration information from an access network device, where the first resource configuration information indicates a time-frequency resource for sending first data and at least one of frequency domain configuration information or time domain configuration information of the time-frequency resource, sending, by the first terminal device, first control information to a second terminal device, where the first control information indicates the time-frequency resource and at least one of the frequency domain configuration information or the time domain configuration information of the time-frequency resource, and sending, by the first terminal device, the first data to the second terminal device on the time-frequency resource.

17 Claims, 8 Drawing Sheets

(58) Field of Classification Search
CPC .............. H04L 5/0053; H04L 5/0087; H04W 72/0406; H04W 72/02; H04W 72/042; H04W 72/044; H04W 72/04; H04W 92/18; H04W 4/40–48
See application file for complete search history.

(56) References Cited

U.S. PATENT DOCUMENTS

| | | | |
|---|---|---|---|
| 2016/0381666 | A1 | 12/2016 | Kim et al. |
| 2017/0156134 | A1 | 6/2017 | Zhao et al. |
| 2017/0245313 | A1* | 8/2017 | Kim ................... H04W 76/14 |
| 2018/0310297 | A1* | 10/2018 | Martin .................. H04W 4/40 |
| 2019/0116608 | A1* | 4/2019 | Kim ................... H04W 72/04 |
| 2019/0124653 | A1* | 4/2019 | Chae .................. H04W 72/02 |
| 2019/0190643 | A1* | 6/2019 | Lee ................... H04L 5/0039 |
| 2019/0208482 | A1* | 7/2019 | Tooher ............... H04L 27/2607 |
| 2019/0246385 | A1* | 8/2019 | Lin ................... H04W 72/044 |
| 2019/0320446 | A1* | 10/2019 | Li ................... H04W 72/1236 |

FOREIGN PATENT DOCUMENTS

| | | |
|---|---|---|
| CN | 106063352 A | 10/2016 |
| CN | 106341839 A | 1/2017 |
| CN | 106612561 | 5/2017 |
| EP | 2974500 | 1/2016 |
| WO | 2014105388 | 10/2014 |
| WO | 2015139349 A1 | 9/2015 |
| WO | 2017024586 A1 | 2/2017 |
| WO | 2017052686 A1 | 3/2017 |

OTHER PUBLICATIONS

Intel Corporation, "On benefits of adjusted LTE numerology for V2V communication," 3GPP TSG RAN WG1 Meeting #83, R1-156535, Anaheim, USA, Nov. 15-22, 2015, 7 pages.
Office Action issued in Chinese Application No. 201710534003.7 dated Feb. 23, 2021, 12 pages.
PCT International Search Report and Written Opinion in International Application No. PCT/CN2018/087,261, dated Jul. 16, 2018, 17 pages (With English Translation).
Catt, "Discussion on eNB assistant resource allocation in PCS-based V2V," 3GPP TSG RAN WG1 Meeting #84bis, R1-162269; Busan, Korea, XP051080074, Apr. 11-15, 2016, 4 pages.
Extended European Search Report issued in European Application No. 18828064.8 dated May 13, 2020, 16 pages.
Gallo et al., "Unsupervised Long-Term Evolution Device-to-Device: A Case Study for Safety-Critical V2X Communications," IEEE vehicular technology magazine, XP011649775, Jun. 1, 2017, 10 pages.
Huawei, Hisilicon, "Coexistence between NR and LTE," 3GPP TSG RAN WG1 Meeting #87, R1-1611681; Reno, USA, Nov. 14-18, 2016, XP051175653, 6 pages.
Intel Corporation, "Satisfying ultra-reliability targets for NR PDCCH," 3GPP TSG RAN WG1 NR Ad-Hoc #2, R1-1710550, Qingdao, P.R. China, XP051299757, Jun. 27-30, 2017, 4 pages.

* cited by examiner

FEEDBACK INFORMATION TRANSMISSION METHOD, TERMINAL DEVICE, AND ACCESS NETWORK DEVICE

CROSS-REFERENCE TO RELATED APPLICATIONS

This application is a continuation of International Application No. PCT/CN2018/087261, filed on May 17, 2018, which claims priority to Chinese Patent Application No. 201710534003.7 filed on Jul. 3, 2017. The disclosures of the aforementioned applications are hereby incorporated by reference in their entireties.

TECHNICAL FIELD

Embodiments of this application relate to communications systems, and in particular, to a data transmission method, a terminal device, and an access network device.

BACKGROUND

Device-to-device (D2D) communication, machine-to-machine (M2M) communication, vehicle-to-vehicle (V2V) communication, vehicle-to-pedestrian (V2P) communication, or vehicle-to-infrastructure/network (V21/N) communication is a technology for terminal devices to directly communicate with each other, that is, direct communication. V2V, V2P, and V21/N are collectively referred to as V2X, that is, communication between a vehicle and everything.

Using V2X communication as an example, in an LTE V2X standard R14 formulated by the 3rd Generation Partnership Project (3GPP), the V2X communication includes mode 3 (Mode 3) and mode 4 (Mode 4). In mode 3, a terminal device performs control information and data communication with another terminal device on a time-frequency resource allocated by an access network device. In mode 4, a terminal device autonomously selects a time-frequency resource and performs control information and data communication with another terminal device on the selected time-frequency resource. In the existing mode 3 and mode 4, a minimum unit, in time domain, of either the time-frequency resource allocated by an access network or the time-frequency resource autonomously selected by the terminal device is fixed, for example, is 1 millisecond; and a minimum unit in frequency domain is also fixed, for example, is 15 kHz. In other words, the minimum units, in time domain and frequency domain, of a time-frequency resource used for V2X communication are both fixed, resulting in a lack of flexibility.

Therefore, a more flexible data transmission method is urgently needed in the industry.

SUMMARY

Embodiments of this application provide a data transmission method, a terminal device, and an access network device, to improve data transmission flexibility in direct communication.

According to a first aspect, a data sending method is provided, including: receiving, by a first terminal device, first resource configuration information from an access network device, where the first resource configuration information is used to indicate a time-frequency resource for sending first data and is used to indicate at least one of frequency domain configuration information and time domain configuration information of the time-frequency resource; sending, by the first terminal device, first control information to a second terminal device, where the first control information is used to indicate the time-frequency resource and is used to indicate at least one of the frequency domain configuration information and the time domain configuration information of the time-frequency resource; and sending, by the first terminal device, the first data to the second terminal device on the time-frequency resource.

In the foregoing solution, minimum units/a minimum unit, in time domain and/or frequency domain, of the time-frequency resource used by the first terminal device to send the first data are/is no longer of fixed sizes/a fixed size, but are/is notified to the first terminal device by the access network device, thereby improving flexibility of the first terminal device in sending data.

In a possible design, a time-frequency resource used by the first terminal device to send the first control information to the second terminal device and the time-frequency resource used by the first terminal device to send the first data to the second terminal device have same frequency domain configuration information and/or time domain configuration information; or a time-frequency resource used by the first terminal device to send the first control information to the second terminal device has a preset frequency domain configuration and/or a preset time domain configuration.

The time-frequency resource used to send the first control information and the time-frequency resource used by the first terminal device to send the first data to the second terminal device have same frequency domain configuration information and/or time domain configuration information, so that complexity of receiving control information and data from the first terminal device by the second terminal device can be reduced.

In a possible design, the frequency domain configuration information includes a minimum unit of the time-frequency resource in frequency domain, and the time domain configuration information includes a minimum unit of the time-frequency resource in time domain.

In a possible design, before the receiving, by a first terminal device, first resource configuration information from an access network device, the method further includes: sending, by the first terminal device, configuration information of the first data to the access network device, where the configuration information of the first data is used by the access network device to determine the first resource configuration information based on the configuration information.

The access network device determines the first resource configuration information based on the configuration information that is of the first data and that is sent by the first terminal device, so that the access network device configures a resource for the data sent by the first terminal device, thereby improving accuracy and effectiveness of resource configuration performed by the access network device for the first terminal device.

In a possible design, the configuration information of the first data includes at least one of the following information of the first data: service type information, service priority information, service latency information, service reliability information, speed value information of the first terminal device, and semi-persistent scheduling assistance information.

According to a second aspect, a terminal device is provided, including: a receiving unit, configured to receive first resource configuration information from an access network device, where the first resource configuration information is used to indicate a time-frequency resource for sending first data and is used to indicate at least one of frequency domain configuration information and time domain configuration information of the time-frequency resource; and a sending unit, configured to send first control information to another terminal device, where the first control information is used to indicate the time-frequency resource and is used to indicate at least one of the frequency domain configuration information and the time domain configuration information of the time-frequency resource, where the sending unit is further configured to send the first data to the another terminal device on the time-frequency resource.

In the foregoing solution, minimum units/a minimum unit, in time domain and/or frequency domain, of the time-frequency resource used by the first terminal device to send the first data are/is no longer of fixed sizes/a fixed size, but are/is notified to the first terminal device by the access network device, thereby improving flexibility of the first terminal device in sending data.

In a possible design, a time-frequency resource used by the sending unit to send the first control information to the another terminal device and the time-frequency resource used by the sending unit to send the first data to the another terminal device have same frequency domain configuration information and/or time domain configuration information; or a time-frequency resource used by the sending unit to send the first control information to the another terminal device has a preset frequency domain configuration and/or a preset time domain configuration.

The time-frequency resource used to send the first control information and the time-frequency resource used by the first terminal device to send the first data to the second terminal device have same frequency domain configuration information and/or time domain configuration information, so that complexity of receiving control information and data from the first terminal device by the second terminal device can be reduced.

In a possible design, the frequency domain configuration information includes a minimum unit of the time-frequency resource in frequency domain, and the time domain configuration information includes a minimum unit of the time-frequency resource in time domain.

In a possible design, before the receiving unit receives the first resource configuration information from the access network device, the sending unit sends configuration information of the first data to the access network device, where the configuration information of the first data is used by the access network device to determine the first resource configuration information based on the configuration information.

The access network device determines the first resource configuration information based on the configuration information that is of the first data and that is sent by the first terminal device, so that the access network device configures a resource for the data sent by the first terminal device, thereby improving accuracy and effectiveness of resource configuration performed by the access network device for the first terminal device.

In a possible design, the configuration information of the first data includes at least one of the following information of the first data: service type information, service priority information, service latency information, service reliability information, speed value information of the first terminal device, and semi-persistent scheduling assistance information.

In a possible design, a processing unit may be a processor, the sending unit may be a transmitter or a transceiver, and the receiving unit may be a receiver or a transceiver.

According to a third aspect, a resource configuration information sending method is provided, including: receiving, by an access network device, configuration information of first data from a first terminal device; determining, by the access network device, first resource configuration information based on the configuration information of the first data, where the first resource configuration information is used to indicate a time-frequency resource for sending the first data and is used to indicate at least one of frequency domain configuration information and time domain configuration information of the time-frequency resource; and sending, by the access network device, the first resource configuration information to the first terminal device.

In the foregoing solution, minimum units/a minimum unit, in time domain and/or frequency domain, of the time-frequency resource used by the first terminal device to send the first data are/is no longer of fixed sizes/a fixed size, but are/is notified to the first terminal device by the access network device, thereby improving flexibility of the first terminal device in sending data.

In a possible design, the frequency domain configuration information includes a minimum unit of the time-frequency resource in frequency domain, and the time domain configuration information includes a minimum unit of the time-frequency resource in time domain.

In a possible design, the configuration information of the first data includes at least one of the following information of the first data: service type information, service priority information, service latency information, service reliability information, speed value information of the first terminal device, and semi-persistent scheduling assistance information.

According to a fourth aspect, an access network device is provided, including: a receiving unit, configured to receive configuration information of first data from a first terminal device; a determining unit, configured to determine first resource configuration information based on the configuration information of the first data, where the first resource configuration information is used to indicate a time-frequency resource for sending the first data and is used to indicate at least one of frequency domain configuration information and time domain configuration information of the time-frequency resource; and a sending unit, configured to send the first resource configuration information to the first terminal device.

In the foregoing solution, minimum units/a minimum unit, in time domain and/or frequency domain, of the time-frequency resource used by the first terminal device to send the first data are/is no longer of fixed sizes/a fixed size, but are/is notified to the first terminal device by the access network device, thereby improving flexibility of the first terminal device in sending data.

In a possible design, the frequency domain configuration information includes a minimum unit of the time-frequency resource in frequency domain, and the time domain configuration information includes a minimum unit of the time-frequency resource in time domain.

In a possible design, the configuration information of the first data includes at least one of the following information of the first data: service type information, service priority information, service latency information, service reliability information, speed value information of the first terminal device, and semi-persistent scheduling assistance information.

In a possible design, a processing unit may be a processor, the sending unit may be a transmitter or a transceiver, and the receiving unit may be a receiver or a transceiver.

According to a fifth aspect, a data sending method is provided, including: receiving, by a first terminal device, configuration information of a first resource pool from an access network device, where the first resource pool includes at least one subpool, and the configuration information of the first resource pool is used to indicate the at least one subpool and frequency domain configuration information and/or time domain configuration information of the at least one subpool; selecting, by the first terminal device, a first subpool from the at least one subpool; selecting, by the first terminal device, a first time-frequency resource from the first subpool; sending, by the first terminal device, first control information to a second terminal device, where the first control information is used to indicate the first time-frequency resource and is used to indicate at least one of frequency domain configuration information and time domain configuration information of the first time-frequency resource; and sending, by the first terminal device, first data to the second terminal device on the first time-frequency resource.

In this embodiment of this application, minimum units/a minimum unit, in time domain and/or frequency domain, of the time-frequency resource used by the first terminal device to send the first data are/is no longer of fixed sizes/a fixed size. Instead, the access network device notifies the first terminal device of a resource subpool included in a candidate resource pool; and notifies the first terminal device of minimum units/a minimum unit, in time domain and/or frequency domain, of a time-frequency resource corresponding to the subpool, thereby improving flexibility of the first terminal device in sending data.

In a possible design, a time-frequency resource used by the first terminal device to send the first control information to the second terminal device and the first time-frequency resource used by the first terminal device to send the first data to the second terminal device have same frequency domain configuration information and/or time domain configuration information; or a time-frequency resource used by the first terminal device to send the first control information to the second terminal device has a preset frequency domain configuration and/or a preset time domain configuration.

The time-frequency resource used to send the first control information and the time-frequency resource used by the first terminal device to send the first data to the second terminal device have same frequency domain configuration information and/or time domain configuration information, so that complexity of receiving control information and data from the first terminal device by the second terminal device can be reduced.

In a possible design, the configuration information of the first resource pool further includes speed information of the at least one subpool; the first terminal device determines a first subpool set based on the speed information of the at least one subpool, where the first subpool set belongs to the at least one subpool; and the selecting, by the first terminal device, a first subpool from the at least one subpool includes: selecting, by the first terminal device, the first subpool from the first subpool set.

In a possible design, the speed information is a first speed value, and when the first terminal device determines that a speed of the first terminal device is greater than or equal to the first speed value, the first terminal device may select the first time-frequency resource from a subpool corresponding to the speed information, or when the first terminal device determines that a speed of the first terminal is less than or equal to the first speed value, the first terminal device may select the first time-frequency resource from a subpool corresponding to the speed information; or the speed information is a first speed range, and when the first terminal device determines that a speed of the first terminal falls within the first speed range, the first terminal device may select the first time-frequency resource from a subpool corresponding to the speed information.

The first terminal device selects, based on the speed information, a resource pool and a time-frequency resource for sending data, so that vehicles at different speeds can be distinguished. For example, a vehicle at a high speed and a vehicle at a low speed have different requirements on resources for sending data. Therefore, a resource for sending data can be more flexibly selected based on a speed of a vehicle.

In a possible design, before the receiving, by a first terminal device, configuration information of a first resource pool from an access network device, the method further includes: sending, by the first terminal device, configuration information of the first data to the access network device.

In a possible design, the configuration information of the first data includes at least one of the following information of the first data: service type information, service priority information, service latency information, service reliability information, speed value information of the first terminal device, and semi-persistent scheduling assistance information.

In a possible design, the frequency domain configuration information includes a minimum unit of the time-frequency resource in frequency domain, and the time domain configuration information includes a minimum unit of the time-frequency resource in time domain.

In a possible design, the configuration information of the first resource pool is included in system information block SIB configuration information or radio resource control RRC configuration information.

According to a sixth aspect, a terminal device is provided, including: a receiving unit, configured to receive configuration information of a first resource pool from an access network device, where the first resource pool includes at least one subpool, and the configuration information of the first resource pool is used to indicate the at least one subpool and frequency domain configuration information and/or time domain configuration information of the at least one subpool; a determining unit, configured to select a first subpool from the at least one subpool, where the determining unit is further configured to select a first time-frequency resource from the first subpool; and a sending unit, configured to send first control information to another terminal device, where the first control information is used to indicate the first time-frequency resource and is used to indicate at least one of frequency domain configuration information and time domain configuration information of the first time-frequency resource, where the sending unit is further configured to send first data to the another terminal device on the first time-frequency resource.

In this embodiment of this application, minimum units/a minimum unit, in time domain and/or frequency domain, of the time-frequency resource used by the first terminal device to send the first data are/is no longer of fixed sizes/a fixed size. Instead, the access network device notifies the first terminal device of a resource subpool included in a candidate resource pool; and notifies the first terminal device of minimum units/a minimum unit, in time domain and/or frequency domain, of a time-frequency resource corresponding to the subpool, thereby improving flexibility of the first terminal device in sending data.

In a possible design, a time-frequency resource used by the sending unit to send the first control information to the another terminal device and the first time-frequency resource used by the sending unit to send the first data to the another terminal device have same frequency domain configuration information and/or time domain configuration information; or a time-frequency resource used by the sending unit to send the first control information to the another terminal device has a preset frequency domain configuration and/or a preset time domain configuration.

The time-frequency resource used to send the first control information and the time-frequency resource used by the first terminal device to send the first data to the second terminal device have same frequency domain configuration information and/or time domain configuration information, so that complexity of receiving control information and data from the first terminal device by the second terminal device can be reduced.

In a possible design, the configuration information of the first resource pool further includes speed information of the at least one subpool; the determining unit determines a first subpool set based on the speed information of the at least one subpool, where the first subpool set belongs to the at least one subpool; and the selecting, by the determining unit, a first subpool from the at least one subpool includes: selecting, by the determining unit, the first subpool from the first subpool set.

In a possible design, the speed information is a first speed value, and when the determining unit determines that a speed of the first terminal device is greater than or equal to the first speed value, the determining unit may select the first time-frequency resource from a subpool corresponding to the speed information, or when the determining unit determines that a speed of the first terminal is less than or equal to the first speed value, the determining unit may select the first time-frequency resource from a subpool corresponding to the speed information; or the speed information is a first speed range, and when the determining unit determines that a speed of the first terminal falls within the first speed range, the determining unit may select the first time-frequency resource from a subpool corresponding to the speed information.

The first terminal device selects, based on the speed information, a resource pool and a time-frequency resource for sending data, so that vehicles at different speeds can be distinguished. For example, a vehicle at a high speed and a vehicle at a low speed have different requirements on resources for sending data. Therefore, a resource for sending data can be more flexibly selected based on a speed of a vehicle.

In a possible design, before the receiving unit receives the configuration information of the first resource pool from the access network device, the sending unit sends configuration information of the first data to the access network device.

In a possible design, the configuration information of the first data includes at least one of the following information of the first data: service type information, service priority information, service latency information, service reliability information, speed value information of the first terminal device, and semi-persistent scheduling assistance information.

In a possible design, the frequency domain configuration information includes a minimum unit of the time-frequency resource in frequency domain, and the time domain configuration information includes a minimum unit of the time-frequency resource in time domain.

In a possible design, the configuration information of the first resource pool is included in system information block SIB configuration information or radio resource control RRC configuration information.

In a possible design, a processing unit may be a processor, the sending unit may be a transmitter or a transceiver, and the receiving unit may be a receiver or a transceiver.

According to a seventh aspect, a resource configuration information sending method is provided, including: sending, by an access network device, configuration information of a first resource pool to a first terminal device, where the first resource pool includes at least one subpool, the configuration information of the first resource pool is used to indicate the at least one subpool and frequency domain configuration information and/or time domain configuration information of the at least one subpool, and the configuration information of the first resource pool is used by the first terminal device to select, from the first resource pool based on the configuration information of the first resource pool, a time-frequency resource for sending first data.

In this embodiment of this application, minimum units/a minimum unit, in time domain and/or frequency domain, of the time-frequency resource used by the first terminal device to send the first data are/is no longer of fixed sizes/a fixed size. Instead, the access network device notifies the first terminal device of a resource subpool included in a candidate resource pool; and notifies the first terminal device of minimum units/a minimum unit, in time domain and/or frequency domain, of a time-frequency resource corresponding to the subpool, thereby improving flexibility of the first terminal device in sending data.

In a possible design, the configuration information of the first resource pool further includes speed information of the at least one subpool, the speed information of the at least one subpool is used by the first terminal device to determine a first subpool set based on the speed information of the at least one subpool, and the first subpool set belongs to the at least one subpool.

In a possible design, the speed information is a first speed value, and when the first terminal device determines that a speed of the first terminal device is greater than or equal to the first speed value, the first terminal device may select a first time-frequency resource from a subpool corresponding to the speed information, where the first time-frequency resource is used by the first terminal device to send data, or when the first terminal device determines that a speed of the first terminal is less than or equal to the first speed value, the first terminal device may select a first time-frequency resource from a subpool corresponding to the speed information, where the first time-frequency resource is used by the first terminal device to send data; or the speed information is a first speed range, and when the first terminal device determines that a speed of the first terminal falls within the first speed range, the first terminal device may select a first time-frequency resource from a subpool corresponding to the speed information, where the first time-frequency resource is used by the first terminal device to send data.

The first terminal device selects, based on the speed information, a resource pool and a time-frequency resource for sending data, so that vehicles at different speeds can be distinguished. For example, a vehicle at a high speed and a vehicle at a low speed have different requirements on resources for sending data. Therefore, a resource for sending data can be more flexibly selected based on a speed of a vehicle.

In a possible design, before the sending, by an access network device, configuration information of a first resource pool to a first terminal device, the method further includes: receiving, by the access network device, configuration information of the first data from the first terminal device.

In a possible design, the configuration information of the first data includes at least one of the following information of the first data: service type information, service priority information, service latency information, service reliability information, speed value information of the first terminal device, and semi-persistent scheduling assistance information.

In a possible design, the frequency domain configuration information includes a minimum unit of the time-frequency resource in frequency domain, and the time domain configuration information includes a minimum unit of the time-frequency resource in time domain.

In a possible design, the configuration information of the first resource pool is included in system information block SIB configuration information or radio resource control RRC configuration information.

According to an eighth aspect, an access network device is provided, including: a sending unit, configured to send configuration information of a first resource pool to a first terminal device, where the first resource pool includes at least one subpool, the configuration information of the first resource pool is used to indicate the at least one subpool and frequency domain configuration information and/or time domain configuration information of the at least one subpool, and the configuration information of the first resource pool is used by the first terminal device to select, from the first resource pool based on the configuration information of the first resource pool, a time-frequency resource for sending first data.

In this embodiment of this application, minimum units/a minimum unit, in time domain and/or frequency domain, of the time-frequency resource used by the first terminal device to send the first data are/is no longer of fixed sizes/a fixed size. Instead, the access network device notifies the first terminal device of a resource subpool included in a candidate resource pool; and notifies the first terminal device of minimum units/a minimum unit, in time domain and/or frequency domain, of a time-frequency resource corresponding to the subpool, thereby improving flexibility of the first terminal device in sending data.

In a possible design, the configuration information of the first resource pool further includes speed information of the at least one subpool, the speed information of the at least one subpool is used by the first terminal device to determine a first subpool set based on the speed information of the at least one subpool, and the first subpool set belongs to the at least one subpool.

In a possible design, the speed information is a first speed value, and when the first terminal device determines that a speed of the first terminal device is greater than or equal to the first speed value, the first terminal device may select a first time-frequency resource from a subpool corresponding to the speed information, where the first time-frequency resource is used by the first terminal device to send data, or when the first terminal device determines that a speed of the first terminal is less than or equal to the first speed value, the first terminal device may select a first time-frequency resource from a subpool corresponding to the speed information, where the first time-frequency resource is used by the first terminal device to send data; or the speed information is a first speed range, and when the first terminal device determines that a speed of the first terminal falls within the first speed range, the first terminal device may select a first time-frequency resource from a subpool corresponding to the speed information, where the first time-frequency resource is used by the first terminal device to send data.

The first terminal device selects, based on the speed information, a resource pool and a time-frequency resource for sending data, so that vehicles at different speeds can be distinguished. For example, a vehicle at a high speed and a vehicle at a low speed have different requirements on resources for sending data. Therefore, a resource for sending data can be more flexibly selected based on a speed of a vehicle.

In a possible design, the access network device further includes a receiving unit, and before the sending unit sends the configuration information of the first resource pool to the first terminal device, the receiving unit receives configuration information of the first data from the first terminal device.

In a possible design, the configuration information of the first data includes at least one of the following information of the first data: service type information, service priority information, service latency information, service reliability information, speed value information of the first terminal device, and semi-persistent scheduling assistance information.

In a possible design, the frequency domain configuration information includes a minimum unit of the time-frequency resource in frequency domain, and the time domain configuration information includes a minimum unit of the time-frequency resource in time domain.

In a possible design, the configuration information of the first resource pool is included in system information block SIB configuration information or radio resource control RRC configuration information.

In a possible design, a processing unit may be a processor, the sending unit may be a transmitter or a transceiver, and the receiving unit may be a receiver or a transceiver.

According to a ninth aspect, an embodiment of this application provides a computer storage medium, configured to store computer software instructions used by the foregoing access network device. The computer storage medium contains a program designed for performing the foregoing aspects.

According to a tenth aspect, an embodiment of this application provides a computer storage medium, configured to store computer software instructions used by the foregoing terminal device. The computer storage medium contains a program designed for performing the foregoing aspects.

According to an eleventh aspect, an embodiment of this application provides a chip. The chip is a chip of an access network device or a chip of a terminal device, and has a signal processing capability. The chip may implement the method according to the first aspect, the third aspect, the fifth aspect, and the seventh aspect.

DESCRIPTION OF EMBODIMENTS

An access network device in this application is an apparatus that is deployed in a radio access network and that is configured to provide a wireless communication function for a terminal device. The access network device may include base stations (BS) in various forms, for example, a macro base station, a micro base station, a relay station, or an access point. In systems using different radio access technologies, a device having an access network device function may have different names. For example, the device is an access network device in a 5th generation 5G network, is referred to as an evolved nodeB (eNB or eNodeB) in a Long Term Evolution (LTE) network, is referred to as a nodeB (NodeB) or the like in a 3rd generation 3G network, or is a road side unit (RSU) in V2V communication. For ease of description, in this application, the apparatuses for providing a wireless communication function for a terminal device are uniformly referred to as an access network device.

The terminal device in this application may include various handheld devices having a wireless communication function, for example, a vehicle-mounted device, a wearable device, a computing device, another processing device connected to a wireless modem, a mobile station (MS), a terminal, or user equipment (UE). For ease of description, in this application, the devices mentioned above are uniformly referred to as a terminal device.

The following describes the embodiments of this application in more detail with reference to specific examples. For example, an access network device is a base station and a terminal device is a terminal.

Figure 1:
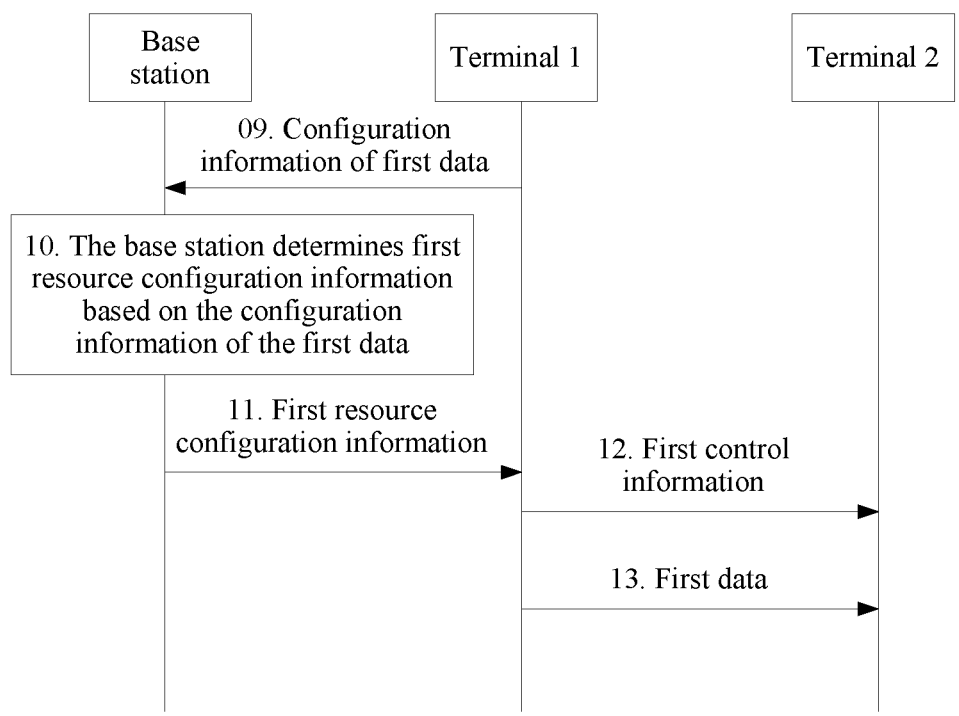
FIG. 1 shows a data sending method according to an embodiment of this application.

FIG. 1 shows a data sending method, an apparatus, and a system in mode 3 according to an embodiment of the present invention.

In mode 3, a base station schedules, for a terminal based on configuration information that is of to-be-sent data and that is sent by the terminal, a resource for sending the to-be-sent data, and a frequency domain configuration and/or a time domain configuration of the resource; and notifies the terminal of the resource and the frequency domain configuration and/or the time domain configuration of the resource. When the terminal receives the resource and the frequency domain configuration and/or the time domain configuration of the resource, the terminal is to send the to-be-sent data on the resource. Certainly, the base station may alternatively directly send a resource and a frequency domain configuration and/or a time domain configuration of the resource to the terminal, without a need to determine the resource and the frequency domain configuration and/or the time domain configuration of the resource based on configuration information that is of to-be-sent data and that is sent by the terminal. In this way, the terminal receives the resource and the frequency domain configuration and/or the time domain configuration of the resource. Then if the terminal is to send data to another terminal, the terminal uses the resource to send the to-be-sent data of the terminal.

Step 09. A terminal 1 sends configuration information of first data to a base station, and the base station receives the configuration information of the first data from the terminal 1. The first data is data generated and sent to another terminal by the terminal 1, for example, information such as a location or a speed generated and sent to another automobile by an automobile 1 and/or sensor data such as high-definition video data of the automobile 1. The first data is used to notify another automobile of a state of the automobile 1 and/or the sensor data of the automobile 1. The configuration information of the first data is used by the base station to determine first resource configuration information based on the configuration information. The first resource configuration information may be specifically downlink control information (DCI). Mode 3 is V2X communication based on scheduling by the base station. Therefore, the configuration information of the first data is used by the terminal 1 to notify the base station that the terminal 1 has the first data that is to be sent to another terminal device, and apply to the base station for a resource. For example, the configuration information of the first data includes at least one of the following information of the first data: service type information, service priority information, service latency information, service reliability information, speed value information of the terminal 1, and semi-persistent scheduling assistance information. The semi-persistent scheduling assistance information includes at least one of service type information, service priority information, logical channel information, service data packet period information, and service data packet size information of a service for which semi-persistent scheduling is to be performed. The service priority information, the service latency information, and the service reliability information may be priority information of the first data, latency information of the first data, and reliability information of the first data; or may be priority information of a service corresponding to the first data, latency information of a service corresponding to the first data, and reliability information of a service corresponding to the first data. The latency information may be latency requirement information. The reliability information may be reliability requirement information. The base station determines, based on the configuration information of the first data, configuration information of a first resource for sending the first data. For example, the base station determines, based on a priority, a resource for sending the service data packet, and configuration information of minimum units/a minimum unit of the resource in frequency domain and/or time domain.

Step 10. The base station determines the first resource configuration information based on the configuration information of the first data, where the first resource is a time-frequency resource allocated by the base station for sending the first data. After receiving the configuration information of the first data, the base station allocates, to the terminal 1 based on the configuration information of the first data, the time-frequency resource for sending the first data; configures at least one of frequency domain configuration information and time domain configuration information of the time-frequency resource; and notifies, by using the first resource configuration information, the terminal 1 of the time-frequency resource for sending the first data and of the at least one of the frequency domain configuration information and the time domain configuration information of the time-frequency resource. The frequency domain configuration information of the time-frequency resource includes a minimum unit of the time-frequency resource in frequency domain, for example, a granularity in frequency domain.

The frequency domain configuration information may be numerology information. The time domain configuration information of the time-frequency resource includes a minimum unit of the time-frequency resource in time domain, for example, a granularity in time domain. The time domain configuration information may be transmission time interval (TTI) information. The numerology represents a subcarrier spacing. The TTI represents a time occupied by several consecutive Orthogonal Frequency-Division Multiplexing (OFDM) symbols in time domain. There is a relationship between a time occupied by a single OFDM symbol and the subcarrier spacing. For specific definitions or descriptions of the numerology and the TTI, refer to 3GPP TR38.912. Details are not described in this application. Step 09 and step 10 are applicable to only a scenario in which: the terminal 1 first has to-be-sent data; and then the base station configures, based on the to-be-sent data, a resource for sending the to-be-sent data, and a frequency domain configuration and/or a time domain configuration of the resource. Therefore, step 09 and step 10 are not essential steps in mode 3.

Step 11: The terminal 1 receives the first resource configuration information from the base station, where the first resource configuration information is used to indicate the time-frequency resource for sending the first data and is used to indicate the at least one of the frequency domain configuration information and the time domain configuration information of the time-frequency resource. The terminal 1 obtains, by receiving the first resource configuration information from the base station, the time-frequency resource for sending the first data; and obtains granularities/a granularity of the minimum units/minimum unit of the time-frequency resource in time domain and/or frequency domain, that is, obtains division granularities/a division granularity of the time-frequency resource in time domain and/or frequency domain.

Step 12. The terminal 1 sends first control information to a terminal 2, and the terminal 2 receives the first control information from the terminal 1. The first control information is used to indicate the time-frequency resource for sending the first data and is used to indicate the at least one of the frequency domain configuration information and the time domain configuration information of the time-frequency resource. For example, the first control information is scheduling grant (Scheduling Assignment, SA) information or sidelink control information (SCI).

A time-frequency resource for sending the first control information and a time-frequency resource for sending data may be set flexibly. For example, a time-frequency resource used by the terminal 1 to send the first control information to the terminal 2 and the time-frequency resource used by the terminal 1 to send the first data to the terminal 2 have same frequency domain configuration information and/or time domain configuration information, so that complexity of receiving control information and data from the terminal 1 by the terminal 2 can be reduced. Certainly, the time-frequency resource used by the terminal 1 to send the first control information to the terminal 2 and the time-frequency resource used by the terminal 1 to send the first data to the terminal 2 may alternatively have different frequency domain configuration information and/or time domain configuration information, so that flexibility of the terminal 1 in sending control information and data can be improved. In this case, the time-frequency resource used by the terminal 1 to send the first control information to the terminal 2 has a preset frequency domain configuration and/or a preset time domain configuration.

The time-frequency resource used by the terminal 1 to send the first control information to the terminal 2 is configured by the base station. The time-frequency resource for sending the first control information and the time-frequency resource for sending the first data are the same in time domain, and are adjacent frequency domain resources in frequency domain. In addition, the time-frequency resource for sending the first control information and the time-frequency resource for sending the first data have same frequency domain configuration information and/or time domain configuration information.

A carrier used by a network device to send the first resource configuration information and a carrier used by the terminal 1 to send the first data to the terminal 2 may be the same or different. This is not limited in the present invention. In other words, a resource scheduled by the network device for the terminal 1 for sending the first data to the terminal 2 may be scheduled in a cross-carrier manner or may be scheduled in a non-cross-carrier manner.

Figure 2:
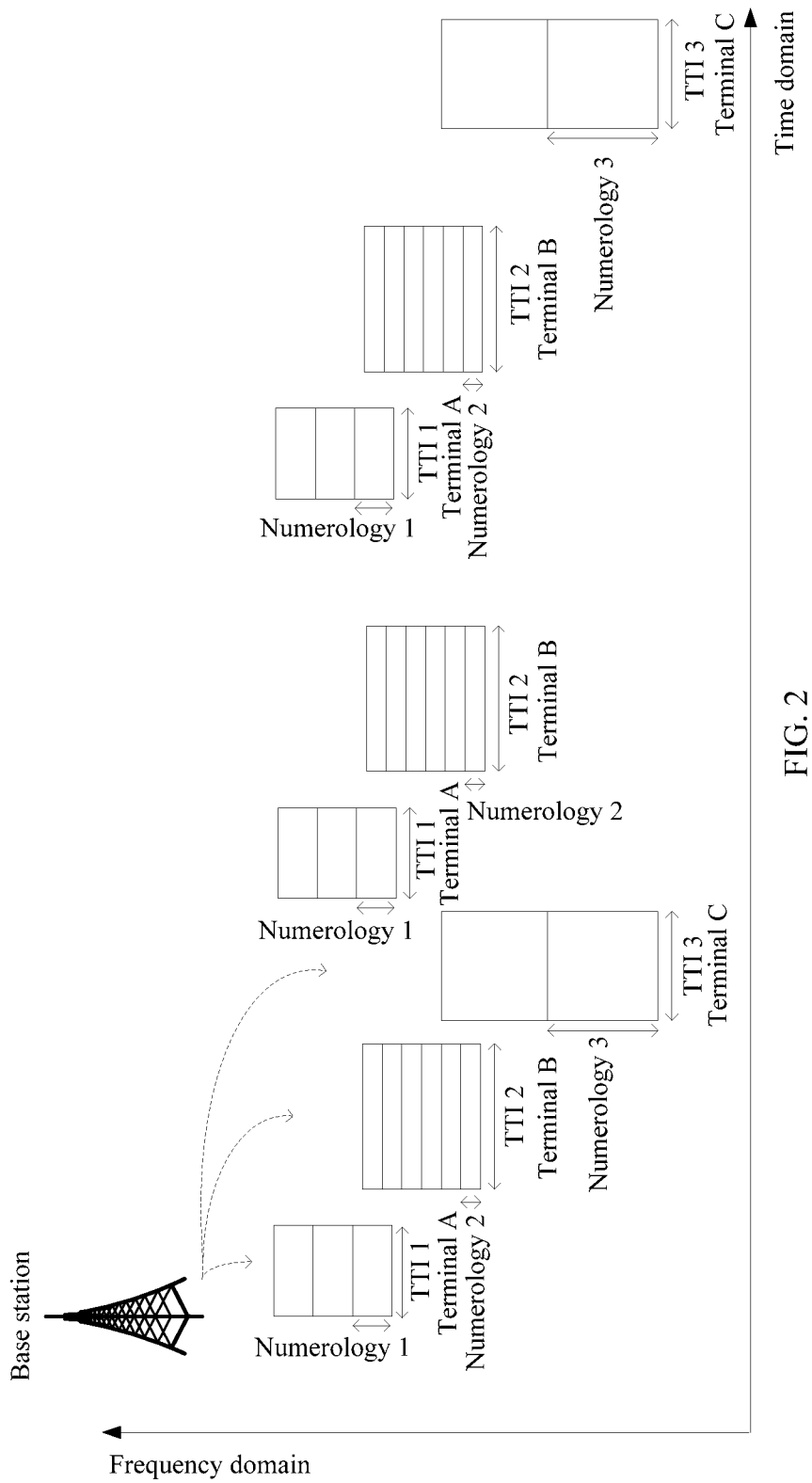
FIG. 2 is a schematic diagram of resource allocation according to an embodiment of this application.

Step 13. The terminal 1 sends the first data to the terminal 2 on the time-frequency resource, and the terminal 2 receives the first data from the terminal 1 on the time-frequency resource. Optionally, step 13 and step 12 are in a same step, in other words, there is no sequential limitation on step 12 and step 13. For example, FIG. 2 shows a semi-persistent scheduling case. To be specific, a resource configured by a base station for a terminal device is valid in a specific time range. The terminal device uses the resource configured by the base station to send data for a plurality of times. Certainly, this embodiment of this application is also applicable to dynamic scheduling. In FIG. 2, when the base station configures, for the terminal device, a time-frequency resource for sending data, the base station configures one TTI in time domain. Certainly, this is only an example, and the base station may alternatively configure a time-frequency resource of a plurality of TTIs for the terminal device for sending data. A terminal A, a terminal B, and a terminal C all have to-be-sent data, but data volumes, latency requirements, and reliability requirements of the to-be-sent data of the terminal A, the terminal B, and the terminal C are different. The base station may configure different time-frequency resources and different numerologies and/or TTIs for different terminal devices, to meet requirements of different user equipment for sending different data. For example, the to-be-sent data of the terminal A has a smallest data volume, the to-be-sent data of the terminal B has a medium data volume, and the to-be-sent data of the terminal C has a greatest data volume. The base station may configure different time-frequency resources and different numerologies and/or TTIs for the different terminal devices, to meet requirements of different user equipment for sending different data. For example, as shown in FIG. 2, the base station configures a numerology 1/TTI 1 for a time-frequency resource used by the terminal A to send data, configures a numerology 2/TTI 2 for a time-frequency resource used by the terminal B to send data, and configures a numerology 3/TTI 3 for a time-frequency resource used by the terminal C to send data. The numerology 1/TTI 1, the numerology 2/TTI 2, and the numerology 3/TTI 3 are different from each other. Therefore, different time-frequency resources and numerologies/TTIs corresponding to the time-frequency resources may be configured for the different terminal devices for sending data, thereby improving flexibility of the terminals in sending data. Certainly, the network device may alternatively configure a same numerology 1 for the terminal A and the terminal B, but configure different TTIs, for example, a TTI 1 and a TTI 2. The network device may alternatively configure different numerologies, for example, a numerology 1 and a numerology 2, for the terminal A and the terminal C, but configure a same TTI. The embodiments of FIG. 1 and FIG. 2 are applicable to any scenario in which a network device allocates a resource on a straight-through link between terminals. For example, in addition to a mode-3 communication manner of an internet of vehicles, the embodiments of FIG. 1 and FIG. 2 are also applicable to a D2D mode-1 communication manner.

In this embodiment of this application, the terminal 1 receives the first resource configuration information from the base station, where the first resource configuration information is used to indicate the time-frequency resource for sending the first data and is used to indicate the at least one of the frequency domain configuration information and the time domain configuration information of the time-frequency resource. The minimum units/minimum unit, in time domain and/or frequency domain, of the time-frequency resource used by the terminal 1 to send the first data are/is no longer of fixed sizes/a fixed size, but are/is notified to the terminal 1 by the base station, thereby improving flexibility of the terminal 1 in sending data.

Figure 3:
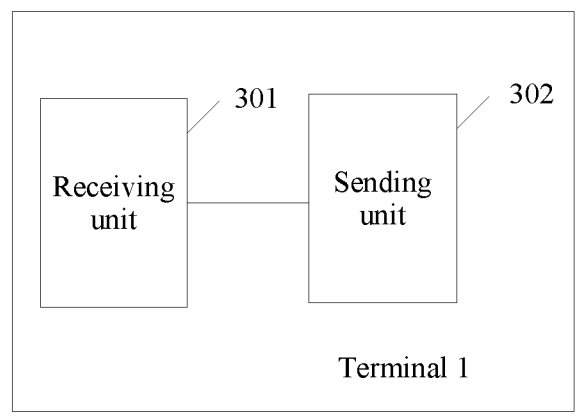
FIG. 3 shows a terminal device according to an embodiment of this application.

FIG. 3 is a possible schematic structural diagram of a terminal 1 for performing the method in the embodiment of FIG. 1. The terminal 1 includes a receiving unit 301 and a sending unit 302.

The receiving unit 301 is configured to receive first resource configuration information from an access network device, where the first resource configuration information is used to indicate a time-frequency resource for sending first data and is used to indicate at least one of frequency domain configuration information and time domain configuration information of the time-frequency resource. The first data and the first resource configuration information are the same as those in the embodiment of FIG. 1, and details are not described herein again.

The sending unit 302 is configured to send first control information to a terminal 2, where the first control information is used to indicate the time-frequency resource and is used to indicate at least one of the frequency domain configuration information and the time domain configuration information of the time-frequency resource. The first control information is the same as that in the embodiment of FIG. 1, and details are not described herein again.

The sending unit 302 is further configured to send the first data to the terminal 2 on the time-frequency resource.

A time-frequency resource for sending the first control information and the time-frequency resource for sending the data may be set flexibly. For example, the time-frequency resource used by the sending unit 302 to send the first control information to the terminal 2 and the time-frequency resource used by the sending unit 302 to send the first data to the terminal 2 have same frequency domain configuration information and/or time domain configuration information. Certainly, the time-frequency resource used by the terminal 1 to send the first control information to the terminal 2 and the time-frequency resource used by the terminal 1 to send the first data to the terminal 2 may alternatively have different frequency domain configuration information and/or time domain configuration information, so that flexibility of the terminal 1 in sending control information and data can be improved. The time-frequency resource used by the sending unit 302 to send the first control information to the terminal 2 has a preset frequency domain configuration and/or a preset time domain configuration.

Specifically, the frequency domain configuration information includes a minimum unit of the time-frequency resource in frequency domain, and the time domain configuration information includes a minimum unit of the time-frequency resource in time domain.

A resource configured by a base station for the terminal 1 may be configured by the base station based on data sent by the terminal 1 to the base station. For example, before the receiving unit 301 receives the first resource configuration information from the access network device, the sending unit 302 sends configuration information of the first data to the access network device, where the configuration information of the first data is used by the access network device to determine the first resource configuration information based on the configuration information.

Specifically, the configuration information of the first data includes at least one of the following information of the first data: service type information, service priority information, service latency information, service reliability information, speed value information of the first terminal device, and semi-persistent scheduling assistance information.

The receiving unit 301 may be a receiver, and the sending unit 302 may be a transmitter. In addition, the terminal 1 may further include a memory, and the memory is configured to store program code and data of the terminal 1.

In this embodiment of this application, the terminal 1 receives the first resource configuration information from the base station, where the first resource configuration information is used to indicate the time-frequency resource for sending the first data and is used to indicate the at least one of the frequency domain configuration information and the time domain configuration information of the time-frequency resource. The minimum units/minimum unit, in time domain and/or frequency domain, of the time-frequency resource used by the terminal 1 to send the first data are/is no longer of fixed sizes/a fixed size, but are/is notified to the terminal 1 by the base station, thereby improving flexibility of the terminal 1 in sending data.

Figure 4:
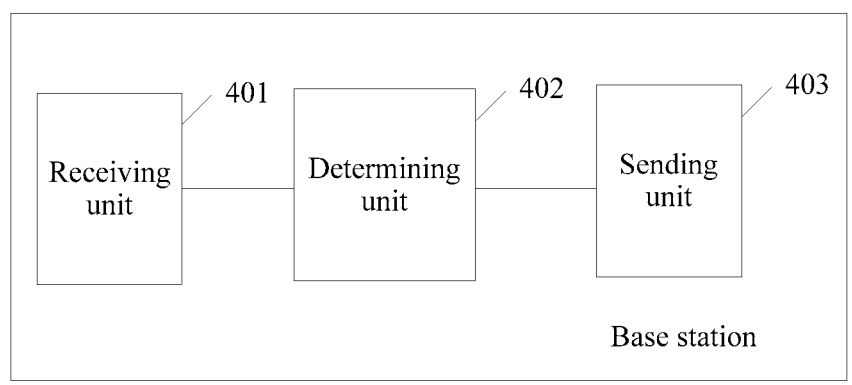
FIG. 4 shows an access network device according to an embodiment of this application.

FIG. 4 is a possible schematic structural diagram of a base station for performing the method in the embodiment of FIG. 1. The base station includes a receiving unit 401, a determining unit 402, and a sending unit 403.

The receiving unit 401 is configured to receive configuration information of first data from a terminal 1. The first data and the configuration information of the first data are the same as those in the embodiment of FIG. 1, and details are not described herein again.

The determining unit 402 is configured to determine first resource configuration information based on the configuration information of the first data, where the first resource configuration information is used to indicate a time-frequency resource for sending the first data and is used to indicate at least one of frequency domain configuration information and time domain configuration information of the time-frequency resource. The first resource configuration information is the same as that in the embodiment of FIG. 1, and details are not described herein again.

The sending unit 403 is configured to send the first resource configuration information to the terminal 1.

Specifically, the frequency domain configuration information includes a minimum unit of the time-frequency resource in frequency domain, and the time domain configuration information includes a minimum unit of the time-frequency resource in time domain.

Specifically, the configuration information of the first data includes at least one of the following information of the first data: service type information, service priority information, service latency information, service reliability information, speed value information of the first terminal device, and semi-persistent scheduling assistance information.

The receiving unit 401 may be a receiver, the determining unit 402 may be a processor, and the sending unit 403 may be a transmitter. In addition, the base station may further include a memory, and the memory is configured to store program code and data of a terminal device.

In this embodiment of this application, the terminal 1 receives the first resource configuration information from the base station, where the first resource configuration information is used to indicate the time-frequency resource for sending the first data and is used to indicate the at least one of the frequency domain configuration information and the time domain configuration information of the time-frequency resource. The minimum units/minimum unit, in time domain and/or frequency domain, of the time-frequency resource used by the terminal 1 to send the first data are/is no longer of fixed sizes/a fixed size, but are/is notified to the terminal 1 by the base station, thereby improving flexibility of the terminal 1 in sending data.

Figure 5:
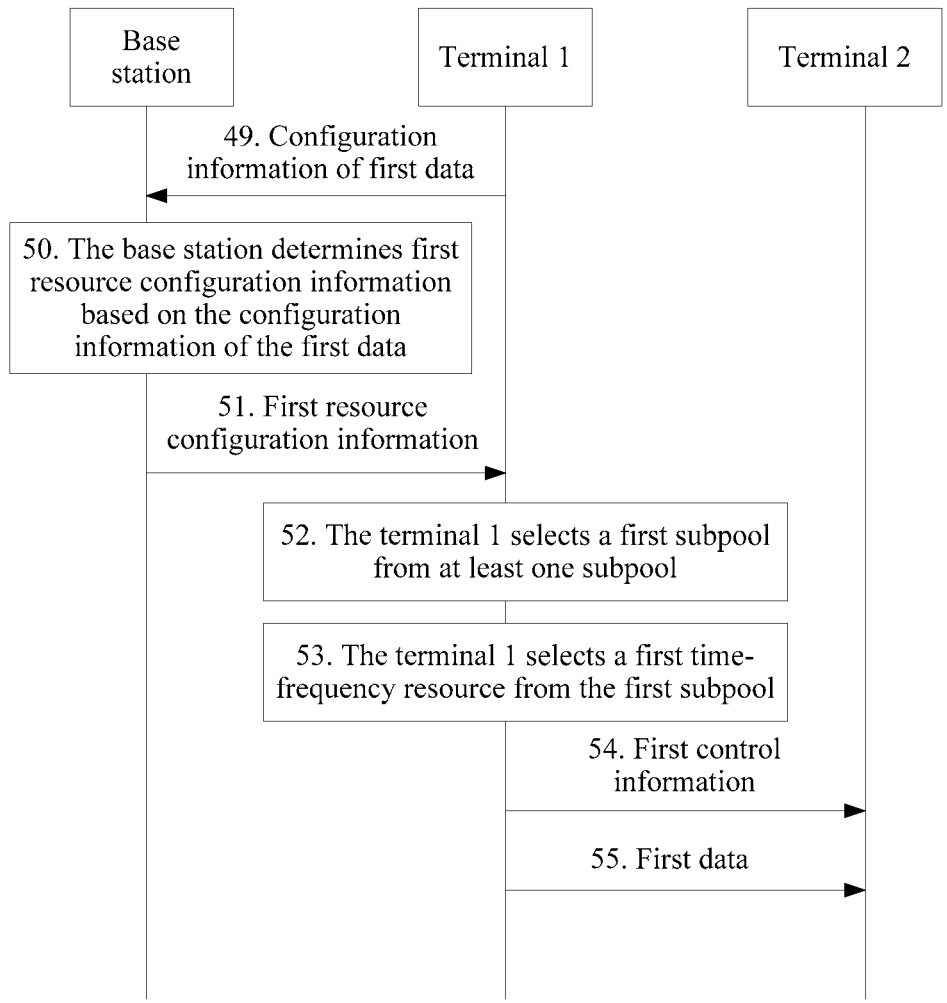
FIG. 5 shows another data sending method according to an embodiment of this application.

FIG. 5 shows a data sending method, an apparatus, and a system in mode 4 according to an embodiment of the present invention.

In mode 4, a base station configures, for a terminal device based on configuration information that is of to-be-sent data and that is sent by the terminal device, a candidate resource pool for sending the to-be-sent data, and a frequency domain configuration and/or a time domain configuration corresponding to a resource subpool included in the resource pool; and notifies the terminal device of the resource pool and the frequency domain configuration and/or the time domain configuration corresponding to the resource subpool included in the resource pool candidate resource pool. When the terminal device receives the candidate resource pool and the frequency domain configuration and/or the time domain configuration corresponding to the resource subpool included in the candidate resource pool, the terminal device selects a resource from the candidate resource pool for sending the to-be-sent data, and the terminal device is to send the to-be-sent data on the selected resource. Certainly, the base station may alternatively directly send, to the terminal device, a candidate resource pool and a frequency domain configuration and/or a time domain configuration corresponding to a resource subpool included in the candidate resource pool, without a need to determine, based on configuration information that is of to-be-sent data and that is sent by the terminal device, the candidate resource pool and the frequency domain configuration and/or the time domain configuration corresponding to the resource subpool included in the candidate resource pool. In this way, the terminal device receives the candidate resource pool and the frequency domain configuration and/or the time domain configuration corresponding to the resource subpool included in the candidate resource pool. Then if the terminal device is to send data to another terminal device, the terminal device selects a resource from the candidate resource pool for sending the to-be-sent data, and subsequently, the terminal device sends the to-be-sent data on the selected resource.

Step 49. A terminal 1 sends configuration information of first data to a base station, and the base station receives the configuration information of the first data from the terminal 1. The first data is data generated and sent to another terminal by the terminal 1, for example, information such as a location or a speed generated and sent to another automobile by an automobile 1 and/or sensor data such as high-definition video data of the automobile 1. The first data is used to notify the another automobile of a state of the automobile 1 and/or the sensor data of the automobile 1. The configuration information of the first data is used by the base station to determine the configuration information of a first resource pool based on the configuration information. For example, the configuration information of the first data includes at least one of the following information of the first data: service type information, service priority information, service latency information, service reliability information, speed value information of the terminal 1, and semi-persistent scheduling assistance information. The semi-persistent scheduling assistance information includes at least one of service type information, service priority information, logical channel information, service data packet period information, and service data packet size information of a service for which semi-persistent scheduling is to be performed. The service priority information, the service latency information, and the service reliability information may be priority information of the first data, latency information of the first data, and reliability information of the first data; or may be priority information of a service corresponding to the first data, latency information of a service corresponding to the first data, and reliability information of a service corresponding to the first data. The latency information may be, but is not limited to, latency requirement information. The reliability information may be, but is not limited to, reliability requirement information. The base station determines, based on the configuration information of the first data, configuration information of a first resource for sending the first data. For example, the base station determines, based on a size and a priority of a service data packet, a resource for sending the service data packet, and configuration information of minimum units/a minimum unit of the resource in frequency domain and/or time domain.

Step 50. The base station determines the configuration information of the first resource pool based on the configuration information of the first data, where the first resource pool is a candidate time-frequency resource pool allocated by the base station for sending the first data. After receiving the configuration information of the first data, the base station allocates, to the terminal 1 based on the configuration information of the first data, the candidate time-frequency resource pool for sending the first data; configures at least one of frequency domain configuration information and time domain configuration information of a time-frequency resource corresponding to a resource subpool included in the resource pool; and notifies, by using the configuration information of the first resource pool, the terminal 1 of the candidate time-frequency resource pool for sending the first data and of the at least one of the frequency domain configuration information and the time domain configuration information of the time-frequency resource. The frequency domain configuration information of the time-frequency resource includes a minimum unit of the time-frequency resource in frequency domain, for example, a granularity in frequency domain. The frequency domain configuration information may be numerology information. The time domain configuration information of the time-frequency resource includes a minimum unit of the time-frequency resource in time domain, for example, a granularity in time domain. The time domain configuration information may be transmission time interval (TTI) information. The numerology represents a subcarrier spacing. The TTI represents a time occupied by several consecutive OFDM symbols in time domain. There is a relationship between a time occupied by a single OFDM symbol and the subcarrier spacing. For specific definitions or descriptions of the numerology and the TTI, refer to 3GPP TR38.912. Details are not described in the present invention. Step 49 and step 50 are applicable to only a scenario in which: the terminal 1 first has to-be-sent data; and then the base station configures, based on the to-be-sent data, a candidate resource pool for sending the to-be-sent data, and a frequency domain configuration and/or a time domain configuration corresponding to a resource subpool included in the resource pool. Therefore, step 49 and step 50 are not essential steps in mode 4.

The first resource pool and the configuration information of the first resource pool may alternatively be determined by the terminal 1 based on the configuration information of the to-be-sent first data. For example, the terminal 1 determines, based on latency information and reliability information of service data, a time-frequency resource for sending to-be-sent data, and time domain configuration information and/or frequency domain configuration information of the time-frequency resource.

Step 51. The terminal 1 receives the configuration information of the first resource pool from the base station, where the first resource pool includes at least one subpool, and the configuration information of the first resource pool is used to indicate the at least one subpool and frequency domain configuration information and/or time domain configuration information of the at least one subpool. The first resource pool is a time-frequency resource range, and each of the at least one subpool also corresponds to a time-frequency resource range. The terminal 1 obtains, by receiving the configuration information of the first resource pool from the base station, a candidate resource of a time-frequency resource for sending the first data; and obtains granularities/a granularity of minimum units/minimum unit of the candidate resource in time domain and/or frequency domain, that is, obtains division granularities/a division granularity of the time-frequency resource in time domain and/or frequency domain. For example, the first resource pool includes three subpools. In this case, the configuration information of the first resource pool is used to indicate time-frequency resources of the three subpools and frequency domain configuration information and/or time domain configuration information respectively corresponding to the three subpools.

When the terminal 1 is connected to the base station, the terminal 1 receives the configuration information of the first resource pool by using radio resource control (RRC) configuration information. When the terminal 1 is in idle mode, the terminal 1 receives the configuration information of the first resource pool by using system information block (SIB) configuration information.

Step 52. The terminal 1 selects a first subpool from the at least one subpool. For example, the first resource pool includes three subpools. Then the terminal 1 selects one subpool from the three subpools as a candidate resource pool, that is, as the first subpool, for sending the first data.

Specifically, when the base station configures a plurality of resource pools or a configured resource pool includes a plurality of subpools, the terminal 1 may select, as the candidate resource pool for sending the data, a resource pool or a subpool in a resource pool based on one or more of the service type information, the service priority information, the service latency information, and the service reliability information. The service priority information, the service latency information, and the service reliability information may be the priority information of the first data, the latency information of the first data, and the reliability information of the first data; or may be the priority information of the service corresponding to the first data, the latency information of the service corresponding to the first data, and the reliability information of the service corresponding to the first data. The latency information may be, but is not limited to, the latency requirement information. The reliability information may be, but is not limited to, the reliability requirement information. Optionally, there is a mapping relationship between the frequency domain configuration information and/or the time domain configuration information and one or more of the service type information, the service priority information, the service latency information, and the service reliability information. For example, the terminal 1 selects, based on a current service priority and a mapping relationship existing between the service priority and the frequency domain configuration information and/or the time domain configuration information, a resource pool or a resource subpool corresponding to frequency domain configuration information and/or time domain configuration information satisfying the service priority.

In an internet of vehicles, there is a specific relationship between a speed of a vehicle and a resource used by the vehicle to send data. The configuration information of the first resource pool further includes speed information of the at least one subpool. The terminal 1 determines a first subpool set based on the speed information of the at least one subpool, where the first subpool set belongs to the at least one subpool. The terminal 1 selects a first subpool from the at least one subpool includes that: The terminal 1 selects the first subpool from the first subpool set. For example, the configuration information of the first resource pool further includes speed information of the three subpools. The terminal 1 selects, based on the speed information of the three subpools, two of the three subpools as the first subpool set, and then the terminal 1 selects one subpool from the first subpool set as the first subpool.

Figure 6:
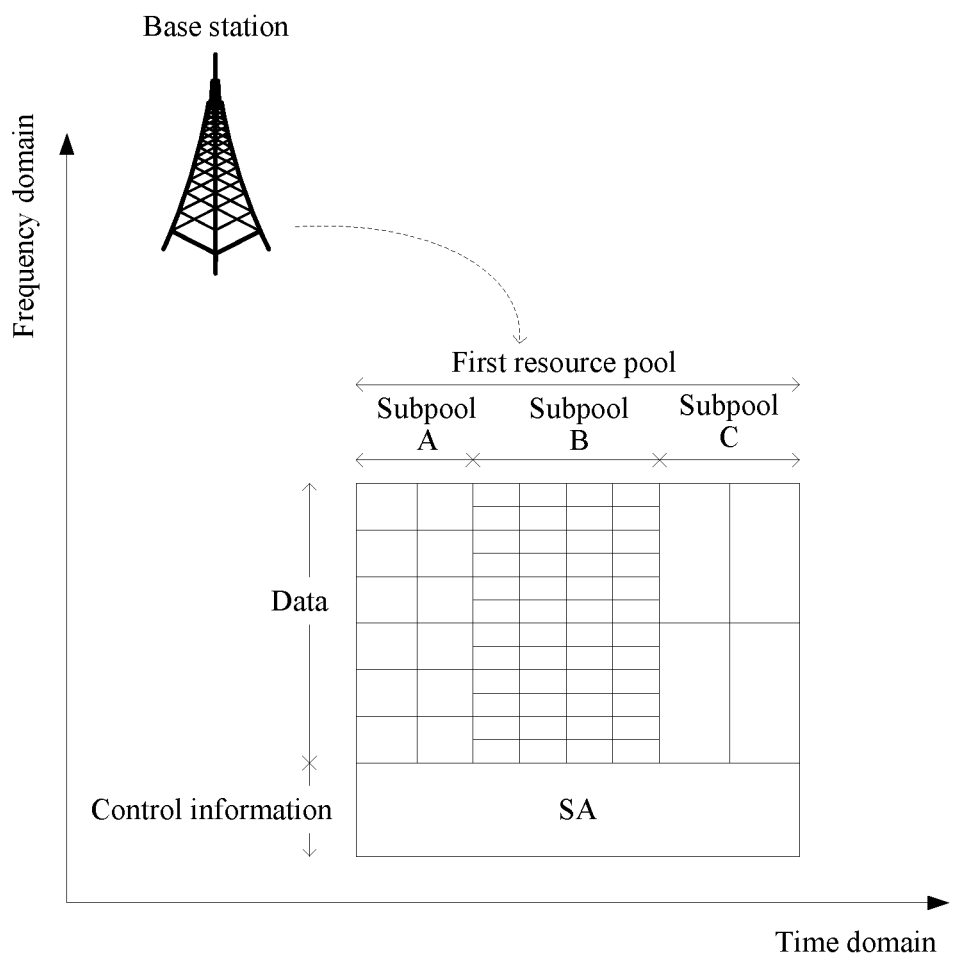
FIG. 6 is a schematic diagram of resource allocation according to an embodiment of this application.

Specifically, the speed information is a first speed value. When the terminal 1 determines that a speed of the terminal 1 is greater than or equal to the first speed value, the terminal 1 may select a first time-frequency resource from a subpool corresponding to the speed information, or when the terminal 1 determines that a speed of the terminal 1 is less than or equal to the first speed value, the terminal 1 may select a first time-frequency resource from a subpool corresponding to the speed information. Alternatively, the speed information is a first speed range, and when the terminal 1 determines that a speed of the terminal 1 falls within the first speed range, the terminal 1 may select a first time-frequency resource from a subpool corresponding to the speed information. For example, FIG. 6 shows a case in which a resource for sending control information and a resource for sending data are frequency division multiplexed. This embodiment of this application is not limited only to frequency division multiplexing, and the resource for sending control information and the resource for sending data may be alternatively time division multiplexed. In addition, a time-frequency resource for sending data may be from a dedicated data resource pool, and a time-frequency resource for sending control information may be from a dedicated control resource pool. A relative relationship between a time-frequency location occupied by the data resource pool and a time-frequency location occupied by the control resource pool is not limited in the present invention, and time-frequency resources occupied by the data resource pool and the control resource pool may not overlap at all, may partially overlap, or may completely overlap. The first resource pool includes three subpools A, B, and C; the configuration information of the first resource pool further includes speed information of the subpool A that is 60 km/h, speed information of the subpool B that is 90 km/h, and speed information of the subpool C that is 100 km/h; and a speed value of the terminal 1 is 95 km/h. The terminal 1 determines, based on a stipulation in a protocol, that the speed value of the terminal 1 is greater than speeds of the subpool A and the subpool B. In this case, the terminal 1 determines that the subpool A and the subpool B may be used as the candidate resource pool for sending the first data. Therefore, the subpool A and the subpool B are the first subpool set. Then the terminal 1 selects one subpool from the first subpool set (the subpool A and the subpool B) as the first subpool.

Figure 7:
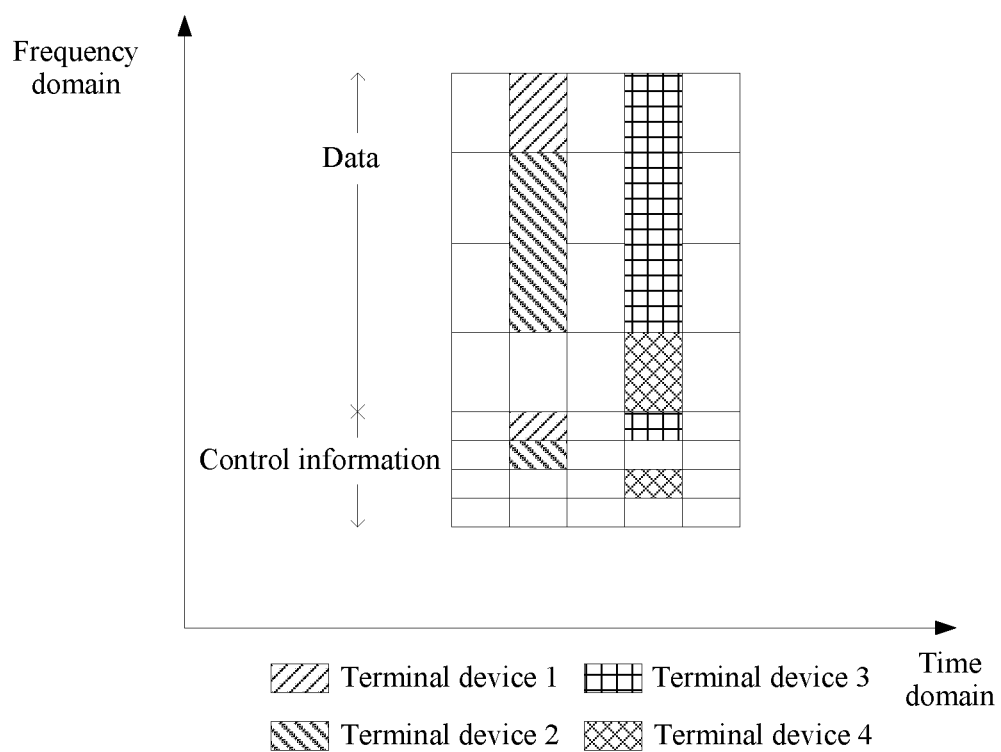
FIG. 7 is a schematic diagram of a location relationship between a data resource and a control information resource according to an embodiment of this application.
Figure 8:
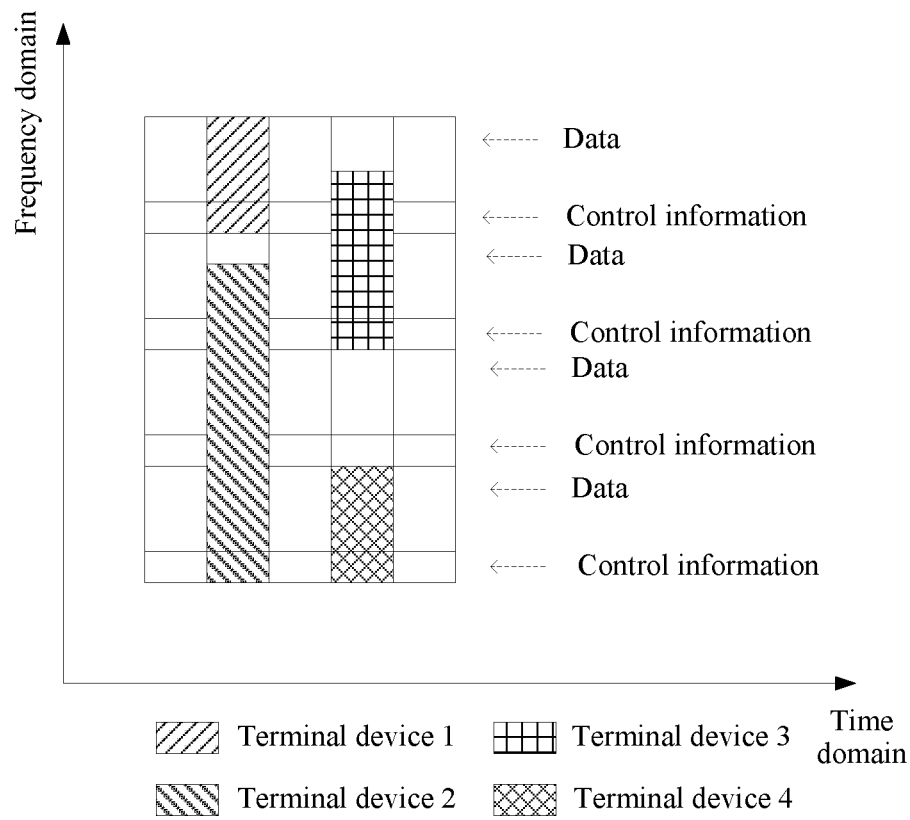
FIG. 8 is a schematic diagram of another location relationship between a data resource and a control information resource according to an embodiment of this application.

A time-frequency resource for sending data and a time-frequency resource for sending control information may be set flexibly. For example, in FIG. 7, a time-frequency resource for sending data and a time-frequency resource for sending control information are two separate parts, data of terminal devices 1 to 4 is to be placed within a data resource range for sending, and control information of all the terminal devices is to be placed within a control information resource range for sending. However, for a specific terminal device, a time-frequency resource for sending data and a time-frequency resource for sending control information are separate at least in frequency domain, and the data resource range and the control information resource range are frequency-divided and are adjacent in frequency domain. Certainly, locations of the control information and the data in FIG. 7 are merely examples. In another possible implementation, a time-frequency resource used by a terminal device to send data and a time-frequency resource used by the terminal device to send control information are adjacent. Specifically, as shown in FIG. 8, for example, for a terminal device 1, a time-frequency resource for sending data and a time-frequency resource for sending control information are the same in time domain, and are adjacent in frequency domain although they are frequency-divided in frequency domain. Certainly, in FIG. 7 and FIG. 8, locations of the control information and the data are merely examples. In the examples of FIG. 7 and FIG. 8, the control information and the data use a frequency division (FDM) form. Certainly, the control information and the data may alternatively use a time division (TDM) form. Certainly, the time-frequency resource for sending data may be from a dedicated data resource pool, and the time-frequency resource for sending control information may be from a dedicated control resource pool. A relative relationship between a time-frequency location occupied by the data resource pool and a time-frequency location occupied by the control resource pool is not limited in the present invention, and time-frequency resources occupied by the data resource pool and the control resource pool may not overlap at all, may partially overlap, or may completely overlap.

In the examples of FIG. 7 and FIG. 8, only whether the time-frequency resource for sending data and the time-frequency resource for sending control information are adjacent is shown, and time domain configuration information and/or frequency domain configuration information corresponding to the time-frequency resource for sending data and the time-frequency resource for sending control information are/is not mentioned. This is not limited in the present invention.

Step 53. The terminal 1 selects the first time-frequency resource from the first subpool. For a specific manner in which the terminal 1 selects the first time-frequency resource from the first subpool, refer to a resource selection manner defined in 3GPP V2X R14, for example, a sensing and resource selection manner, a partial sensing-based selection manner, or a random resource selection manner, where in the sensing and resource selection manner, to select a resource, whether the resource is occupied is first sensed, and if the resource is not occupied, the resource may be selected. Alternatively, a series of resource selection manners such as Carrier Sense Multiple Access (CSMA) defined in IEEE 802.11p may be used.

When the terminal 1 selects a resource, the terminal 1 may use a sensing manner or a partial sensing manner. For example, a basic time domain unit for selecting a resource from a resource pool or a resource subpool by the terminal 1 in a sensing and resource selection manner or a partial sensing-based selection manner may be time domain configuration information corresponding to a selected resource pool or resource subpool. For example, in R14 V2X, when a terminal senses a resource, the terminal needs to continuously perform sensing for 1000 ms in time domain, and a basic time domain unit of the sensing is 1 ms. If the terminal selects a resource subpool A, a basic time domain unit of sensing by the terminal may be time domain configuration information corresponding to the subpool A.

In an optional embodiment, a media access control layer (Media Access Control, MAC) of the terminal 1 may deliver one or more of the service type information, the service priority information, the service latency information, and the service reliability information of the first data to a physical layer (PHY). The physical layer selects a candidate resource set from the first subpool, and then delivers the candidate resource set to the MAC layer. Then the MAC layer selects the first time-frequency resource from the candidate resource set. The candidate resource set delivered by the physical layer to the MAC layer may include one or more types of frequency domain configuration information and/or time domain configuration information. The service priority information, the service latency information, and the service reliability information may be the priority information of the first data, the latency information of the first data, and the reliability information of the first data; or may be the priority information of the service corresponding to the first data, the latency information of the service corresponding to the first data, and the reliability information of the service corresponding to the first data. The latency information may be, but is not limited to, the latency requirement information. The reliability information may be, but is not limited to, the reliability requirement information.

In an optional embodiment, a media access control layer (MAC) of the terminal 1 may deliver an identifier of at least one of the determined frequency domain configuration information and/or time domain configuration information to a physical layer. The physical layer selects, from the first subpool, a candidate resource set that satisfies the at least one of the frequency domain configuration information and/or the time domain configuration information, and then delivers the candidate resource set to the MAC layer. Then the MAC layer selects the first time-frequency resource from the candidate resource set.

In an optional embodiment, a media access control layer (MAC) of the terminal 1 may deliver at least one of the determined frequency domain configuration information and/or time domain configuration information and a required resource volume to a physical layer. The physical layer selects, from the first subpool, a candidate resource set that satisfies the required resource volume and satisfies the at least one of the frequency domain configuration information and/or the time domain configuration information, and then delivers the candidate resource set to the MAC layer. The resource volume is a determined value. Optionally, the resource volume may be a quantity of physical resource blocks (Physical Resource Block, PRB) or subchannels. Optionally, the resource volume may be used to represent a resource volume required by the MAC layer. In this case, the MAC layer determines that the candidate resource set delivered by the PHY layer is the first time-frequency resource. Optionally, the resource volume is used to represent a maximum resource volume required by the MAC layer. In this case, the MAC layer selects, as the first time-frequency resource, a part or an entirety of the candidate resource set delivered by the PHY layer.

Step 54. The terminal 1 sends first control information to a terminal 2, and the terminal 2 receives the first control information from the terminal 1, where the first control information is used to indicate the first time-frequency resource and is used to indicate at least one of frequency domain configuration information and time domain configuration information of the first time-frequency resource. For example, the first control information is SA information or SCI.

A time-frequency resource for sending the first control information and a time-frequency resource for sending data may be set flexibly. For example, a time-frequency resource used by the terminal 1 to send the first control information to the terminal 2 and the time-frequency resource used by the terminal 1 to send the first data to the terminal 2 have same frequency domain configuration information and/or time domain configuration information, so that complexity of receiving control information and data from the terminal 1 by the terminal 2 can be reduced. Certainly, the time-frequency resource used by the terminal 1 to send the first control information to the terminal 2 and the time-frequency resource used by the terminal 1 to send the first data to the terminal 2 may alternatively have different frequency domain configuration information and/or time domain configuration information, so that flexibility of the terminal 1 in sending control information and data can be improved. In this case, the time-frequency resource used by the terminal 1 to send the first control information to the terminal 2 has a preset frequency domain configuration and/or a preset time domain configuration.

Specifically, the time-frequency resource used by the terminal 1 to send the first control information to the terminal 2 is selected by the terminal 1 from an SA candidate resource pool. The time-frequency resource for sending the first control information and the time-frequency resource for sending the first data are the same in time domain, and are adjacent frequency domain resources in frequency domain. In addition, the time-frequency resource for sending the first control information and the time-frequency resource for sending the first data have same frequency domain configuration information and/or time domain configuration information. Optionally, a relationship between the time-frequency resource for sending control information and the time-frequency resource for sending data may be a time division multiplexing TDM manner, or may be a frequency division multiplexing FDM manner.

In an optional embodiment, the time-frequency resource for sending data is from a data resource pool, and the time-frequency resource for sending control information is from a control resource pool. A relative relationship between a time-frequency location occupied by the data resource pool and a time-frequency location occupied by the control resource pool is not limited in the present invention, and time-frequency resources occupied by the data resource pool and the control resource pool may not overlap at all, may partially overlap, or may completely overlap.

Step 55. The terminal 1 sends the first data to the terminal 2 on the first time-frequency resource.

In this embodiment of this application, the terminal 1 receives the configuration information of the first resource pool from the base station, where the first resource pool includes the at least one subpool, and the configuration information of the first resource pool is used to indicate the at least one subpool and the frequency domain configuration information and/or the time domain configuration information of the at least one subpool. The terminal 1 selects the first subpool from the first resource pool and then selects the first time-frequency resource from the first subpool for sending the first data. The minimum units/minimum unit, in time domain and/or frequency domain, of the time-frequency resource used by the terminal 1 to send the first data are/is no longer of fixed sizes/a fixed size, but are/is notified to the terminal 1 by the base station, thereby improving flexibility of the terminal 1 in sending data. The embodiment of FIG. 5 is applicable to a scenario in which a terminal autonomously selects a resource on a direct link between terminals. For example, in addition to a mode-4 communication manner of the internet of vehicles, FIG. 5 is also applicable to a D2D mode-2 communication manner.

Figure 9:
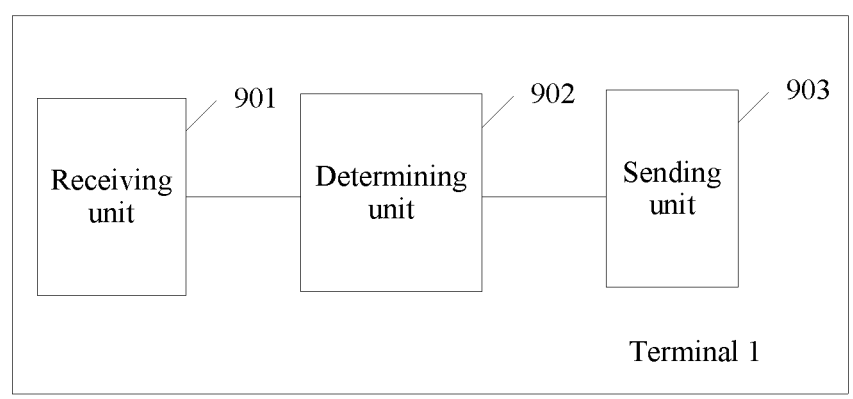
FIG. 9 shows a terminal device according to an embodiment of this application.

FIG. 9 is a possible schematic structural diagram of a terminal 1 for performing the method in the embodiment of FIG. 5. The terminal 1 includes a receiving unit 901, a determining unit 902, and a sending unit 903.

The receiving unit 901 is configured to receive configuration information of a first resource pool from an access network device, where the first resource pool includes at least one subpool, and the configuration information of the first resource pool is used to indicate the at least one subpool and frequency domain configuration information and/or time domain configuration information of the at least one subpool. The configuration information of the first resource pool is the same as that in the embodiment of FIG. 5, and details are not described herein again.

The determining unit 902 is configured to select a first subpool from the at least one subpool. The first subpool is the same as that in the embodiment of FIG. 5, and details are not described herein again.

The determining unit 902 is further configured to select a first time-frequency resource from the first subpool. The first time-frequency resource is the same as that in the embodiment of FIG. 5, and details are not described herein again.

The sending unit 903 is configured to send first control information to a terminal 2, where the first control information is used to indicate the first time-frequency resource and is used to indicate at least one of frequency domain configuration information and time domain configuration information of the first time-frequency resource. The first control information is the same as that in the embodiment of FIG. 5, and details are not described herein again.

The sending unit 903 is further configured to send first data to the terminal 2 on the first time-frequency resource. The first data is the same as that in the embodiment of FIG. 5, and details are not described herein again.

A time-frequency resource for sending the first control information and a time-frequency resource for sending data may be set flexibly. For example, a time-frequency resource used by the sending unit to send the first control information to another terminal device and a first time-frequency resource used by the sending unit to send the first data to the another terminal device have same frequency domain configuration information and/or time domain configuration information. Alternatively, a time-frequency resource used by the sending unit to send the first control information to another terminal device has a preset frequency domain configuration and/or a preset time domain configuration.

In an internet of vehicles, there is a relationship between a speed of a vehicle and a resource used by the vehicle to send data. For example, the configuration information of the first resource pool further includes speed information of the at least one subpool; the determining unit determines a first subpool set based on the speed information of the at least one subpool, where the first subpool set belongs to the at least one subpool; and the selecting, by the determining unit, a first subpool from the at least one subpool includes: selecting, by the determining unit, the first subpool from the first subpool set.

Specifically, the speed information is a first speed value, and when the determining unit determines that a speed of the first terminal device is greater than or equal to the first speed value, the determining unit may select the first time-frequency resource from a subpool corresponding to the speed information, or when the determining unit determines that a speed of the first terminal is less than or equal to the first speed value, the determining unit may select the first time-frequency resource from a subpool corresponding to the speed information. Alternatively, the speed information is a first speed range, and when the determining unit determines that a speed of the first terminal falls within the first speed range, the determining unit may select the first time-frequency resource from a subpool corresponding to the speed information.

Before the receiving unit receives the configuration information of the first resource pool from the access network device, the sending unit sends configuration information of the first data to the access network device.

Specifically, the configuration information of the first data includes at least one of the following information of the first data: service type information, service priority information, service latency information, service reliability information, speed value information of the first terminal device, and semi-persistent scheduling assistance information.

Specifically, the frequency domain configuration information includes a minimum unit of the time-frequency resource in frequency domain, and the time domain configuration information includes a minimum unit of the time-frequency resource in time domain.

Specifically, the configuration information of the first resource pool is included in system information block SIB configuration information or radio resource control RRC configuration information.

The receiving unit 901 may be a receiver, the determining unit 902 may be a processor, and the sending unit 903 may be a transmitter. In addition, the base station may further include a memory, and the memory is configured to store program code and data of the terminal device.

In this embodiment of this application, the terminal 1 receives the configuration information of the first resource pool from the base station, where the first resource pool includes the at least one subpool, and the configuration information of the first resource pool is used to indicate the at least one subpool and the frequency domain configuration information and/or the time domain configuration information of the at least one subpool. The terminal 1 selects the first subpool from the first resource pool and then selects the first time-frequency resource from the first subpool for sending the first data. The minimum units/minimum unit, in time domain and/or frequency domain, of the time-frequency resource used by the terminal 1 to send the first data are/is no longer of fixed sizes/a fixed size, but are/is notified to the terminal 1 by the base station, thereby improving flexibility of the terminal 1 in sending data.

Figure 10:
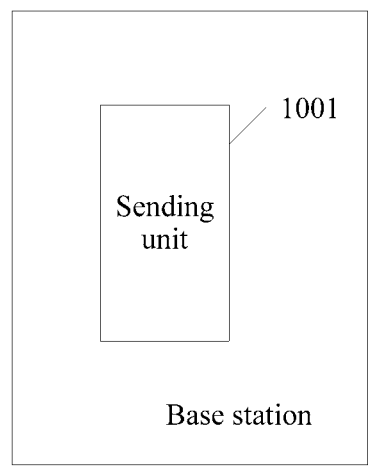
FIG. 10 shows an access network device according to an embodiment of this application.

FIG. 10 is a possible schematic structural diagram of a base station for performing the method in the embodiment of FIG. 5. The base station includes a sending unit 1001.

The sending unit 1001 is configured to send configuration information of a first resource pool to a terminal 1, where the first resource pool includes at least one subpool, the configuration information of the first resource pool is used to indicate the at least one subpool and frequency domain configuration information and/or time domain configuration information of the at least one subpool, and the configuration information of the first resource pool is used by the terminal 1 to select, from the first resource pool based on the configuration information of the first resource pool, a time-frequency resource for sending first data. The first data, the first resource pool, and the configuration information of the first resource pool are the same as those in the embodiment of FIG. 5, and details are not described herein again.

In an internet of vehicles, there is a relationship between a speed of a vehicle and a resource used by the vehicle to send data. For example, the configuration information of the first resource pool further includes speed information of the at least one subpool, the speed information of the at least one subpool is used by the first terminal device to determine a first subpool set based on the speed information of the at least one subpool, and the first subpool set belongs to the at least one subpool.

Specifically, the speed information is a first speed value, and when the first terminal device determines that a speed of the first terminal device is greater than or equal to the first speed value, the terminal 1 may select a first time-frequency resource from a subpool corresponding to the speed information, where the first time-frequency resource is used by the terminal 1 to send data, or when the terminal 1 determines that a speed of the first terminal is less than or equal to the first speed value, the terminal 1 may select a first time-frequency resource from a subpool corresponding to the speed information, where the first time-frequency resource is used by the terminal 1 to send data. Alternatively, the speed information is a first speed range, and when the terminal 1 determines that a speed of the terminal 1 falls within the first speed range, the terminal 1 may select a first time-frequency resource from a subpool corresponding to the speed information, where the first time-frequency resource is used by the terminal 1 to send data.

The base station may further include a receiving unit 1002, and before the sending unit 1001 sends the configuration information of the first resource pool to the terminal 1, the receiving unit receives configuration information of the first data from the terminal 1. The configuration information of the first data is the same as that in the embodiment of FIG. 5, and details are not described herein again.

Specifically, the configuration information of the first data includes at least one of the following information of the first data: service type information, service priority information, service latency information, service reliability information, speed value information of the first terminal device, and semi-persistent scheduling assistance information.

Specifically, the frequency domain configuration information includes a minimum unit of the time-frequency resource in frequency domain, and the time domain configuration information includes a minimum unit of the time-frequency resource in time domain.

Specifically, the configuration information of the first resource pool is included in system information block SIB configuration information or radio resource control RRC configuration information.

The sending unit 1001 may be a transmitter, and the receiving unit 1002 may be a receiver. In addition, the base station may further include a memory, and the memory is configured to store program code and data of a terminal device.

In this embodiment of this application, the terminal 1 receives the configuration information of the first resource pool from the base station, where the first resource pool includes the at least one subpool, and the configuration information of the first resource pool is used to indicate the at least one subpool and the frequency domain configuration information and/or the time domain configuration information of the at least one subpool. The terminal 1 selects the first subpool from the first resource pool and then selects the first time-frequency resource from the first subpool for sending the first data. The minimum units/minimum unit, in time domain and/or frequency domain, of the time-frequency resource used by the terminal 1 to send the first data are/is no longer of fixed sizes/a fixed size, but are/is notified to the terminal 1 by the base station, thereby improving flexibility of the terminal 1 in sending data.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A data sending method, comprising:
    receiving, by a first terminal device, first resource configuration information from an access network device, wherein the first resource configuration information indicates a time-frequency resource for sending first data and at least one of frequency domain configuration information or time domain configuration information of the time-frequency resource, wherein the frequency domain configuration information comprises subcarrier spacing information, and wherein the time domain configuration information comprises transmission time interval (TTI) information;
    sending, by the first terminal device, first control information to a second terminal device, wherein the first control information indicates the time-frequency resource and at least one of the frequency domain configuration information or the time domain configuration information of the time-frequency resource; and
    sending, by the first terminal device, the first data to the second terminal device on the time-frequency resource.

2. The method according to claim 1, wherein:
    a time-frequency resource used by the first terminal device to send the first control information to the second terminal device and the time-frequency resource used by the first terminal device to send the first data to the second terminal device have at least one of same frequency domain configuration information or same time domain configuration information; or
    a time-frequency resource used by the first terminal device to send the first control information to the second terminal device has at least one of a preset frequency domain configuration or a preset time domain configuration.

3. The method according to claim 1, wherein:
    the frequency domain configuration information comprises a minimum unit of the time-frequency resource in frequency domain; and
    the time domain configuration information comprises a minimum unit of the time-frequency resource in time domain.

4. The method according to claim 1, wherein before the receiving, by a first terminal device, first resource configuration information from an access network device, the method further comprises:
    sending, by the first terminal device, configuration information of the first data to the access network device, wherein the configuration information of the first data is used by the access network device to determine the first resource configuration information based on the configuration information.

5. The method according to claim 4, wherein:
    the configuration information of the first data comprises at least one of the following information of the first data:
    service type information, service priority information, service latency information, service reliability information, speed value information of the first terminal device, or semi-persistent scheduling assistance information.

6. A terminal device, comprising:
    a receiver, the receiver configured to receive, first resource configuration information from an access network device, wherein the first resource configuration information indicates a time-frequency resource for sending first data and at least one of frequency domain configuration information or time domain configuration information of the time-frequency resource, wherein the frequency domain configuration information comprises subcarrier spacing information, and wherein the time domain configuration information comprises transmission time interval (TTI) information; and a transmitter, the transmitter configured to:
  send first control information to another terminal device, wherein the first control information indicates the time-frequency resource and at least one of the frequency domain configuration information or the time domain configuration information of the time-frequency resource; and
  send the first data to the another terminal device on the time-frequency resource.

7. The terminal device according to claim 6, wherein:
a time-frequency resource used to send the first control information to the another terminal device and the time-frequency resource used to send the first data to the another terminal device have at least one of same frequency domain configuration information or same time domain configuration information; or
a time-frequency resource used to send the first control information to the another terminal device has at least one of a preset frequency domain configuration or a preset time domain configuration.

8. The terminal device according to claim 6, wherein:
the frequency domain configuration information comprises a minimum unit of the time-frequency resource in frequency domain; and
the time domain configuration information comprises a minimum unit of the time-frequency resource in time domain.

9. The terminal device according to claim 6, wherein before the receiver receives the first resource configuration information from the access network device, the transmitter sends configuration information of the first data to the access network device, wherein the configuration information of the first data is used by the access network device to determine the first resource configuration information based on the configuration information.

10. The terminal device according to claim 9, wherein:
the configuration information of the first data comprises at least one of the following information of the first data:
service type information, service priority information, service latency information, service reliability information, speed value information of the terminal device, or semi-persistent scheduling assistance information.

11. A data sending method, comprising:
receiving, by a first terminal device, configuration information of a first resource pool from an access network device, wherein the first resource pool comprises at least one subpool, and wherein the configuration information of the first resource pool indicates the at least one subpool and at least one of frequency domain configuration information or time domain configuration information of the at least one subpool;
selecting, by the first terminal device, a first subpool from the at least one subpool;
selecting, by the first terminal device, a first time-frequency resource from the first subpool;
sending, by the first terminal device, first control information to a second terminal device, wherein the first control information indicates the first time-frequency resource and at least one of frequency domain configuration information or time domain configuration information of the first time-frequency resource, and wherein the frequency domain configuration information comprises a minimum unit of the first time-frequency resource in frequency domain and the time domain configuration information comprises a minimum unit of the first time-frequency resource in time domain; and
sending, by the first terminal device, first data to the second terminal device on the first time-frequency resource.

12. The method according to claim 11, wherein:
a time-frequency resource used by the first terminal device to send the first control information to the second terminal device and the first time-frequency resource used by the first terminal device to send the first data to the second terminal device have at least one of same frequency domain configuration information or same time domain configuration information; or
a time-frequency resource used by the first terminal device to send the first control information to the second terminal device has at least one of a preset frequency domain configuration or a preset time domain configuration.

13. The method according to claim 11, wherein:
the configuration information of the first resource pool further comprises speed information of the at least one subpool;
the first terminal device determines a first subpool set based on the speed information of the at least one subpool, wherein the first subpool set belongs to the at least one subpool; and
the selecting, by the first terminal device, a first subpool from the at least one subpool comprises selecting, by the first terminal device, the first subpool from the first subpool set.

14. The method according to claim 13, wherein:
the speed information is a first speed value, and when the first terminal device determines that a speed of the first terminal device is greater than or equal to the first speed value, the first terminal device selects the first time-frequency resource from a subpool corresponding to the speed information, or when the first terminal device determines that a speed of the first terminal device is less than or equal to the first speed value, the first terminal device selects the first time-frequency resource from a subpool corresponding to the speed information; or
the speed information is a first speed range, and when the first terminal device determines that a speed of the first terminal device falls within the first speed range, the first terminal device selects the first time-frequency resource from a subpool corresponding to the speed information.

15. The method according to claim 11, wherein before the receiving, by a first terminal device, configuration information of a first resource pool from an access network device, the method further comprises:
sending, by the first terminal device, configuration information of the first data to the access network device.

16. The method according to claim 15, wherein:
the configuration information of the first data comprises at least one of the following information of the first data:
service type information, service priority information, service latency information, service reliability information, speed value information of the first terminal device, or semi-persistent scheduling assistance information.

17. The method according to claim 11, wherein the configuration information of the first resource pool is comprised in system information block (SIB) configuration information or radio resource control (RRC) configuration information.

\* \* \* \* \*